F. LOWE.
DEMOUNTABLE RIM.
APPLICATION FILED MAY 29, 1915.
1,216,240.  Patented Feb. 13, 1917.
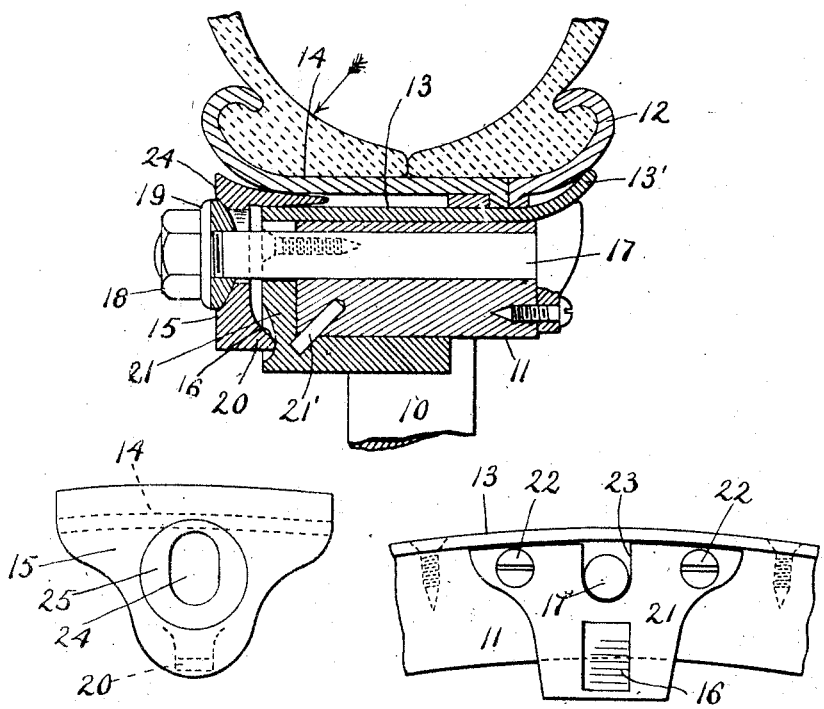
Inventor:
Frederick Lowe
by Mitchell, Chadwick & Kent
Att'ys

UNITED STATES PATENT OFFICE.

FREDERICK LOWE, OF CAMBRIDGE, MASSACHUSETTS.

DEMOUNTABLE RIM.

1,216,240.

Specification of Letters Patent.   Patented Feb. 13, 1917.

Application filed May 29, 1915. Serial No. 31,271.

*To all whom it may concern:*

Be it known that I, FREDERICK LOWE, a citizen of the United States, residing at Cambridge, in the county of Middlesex and State of Massachusetts, have invented new and useful Improvements in Demountable Rims, of which the following is a specification.

This invention relates to improvements in mountings for demountable rims, such as are used for pneumatic tires on automobile or other vehicle wheels, this application for patent being a continuation in part of my application filed August 22, 1913, Serial No. 726,099. Such rims have hitherto usually been held in place either by a ring inserted laterally between the rim and the felly of the wheel or by lugs bolted to the side of the felly and projecting between it and the rim. Although these arrangements are extensively in use, neither of them is permanently firm. The present invention is intended to provide a support for the rim which shall be firm and unyielding upon the felly and capable of retaining its firmness permanently, or of being adjusted into a firm relation in case of extraordinary circumstances in which such adjustment has become necessary. To this end the invention provides an angular base plate engaging the side and inside of the felly and a lever fulcrumed at one end on the base plate at the inner corner of the felly and having its other end of wedge shape adapted to be inserted between the felly and the rim, with other special devices hereinafter more fully described. In demountable rims as now customarily constructed the lug sometimes becomes bent outward, and particularly when the bolt holding it is also bent, the rim is thereafter not supported rigidly. Then constant bending or deforming of the rim occurs, affecting the life of the rim adversely and by the constant bending of the metal introducing other undesirable characteristics of operation. The bending absorbs power which is wasted in heating the rim and in some cases there is also an unpleasant squeaky noise. The ring system of holding a rim in place is subject to the inherent disadvantage that it closes the spaces between the rim and felly against circulation of air and thus facilitates heating of the tire; and as the ring does not support the rim with absolute firmness except where it is backed by lugs, and as it is not attached firmly to these lugs the ring is liable to incessant slight bending under the stresses constantly acting through the rim, while the wheel is running. The invention provides a structure in which the stresses playing between the rim and the felly pass directly through a block (the wedge end of the lever) which acts as a firm and unbendable strut between the felly and the rim, having its "felly bearing" on the band which encircles the felly, thus affording a firm support. While the wedge is, as a practical matter, so sharp that the component force tending to eject the wedge, is not as great as the friction resisting ejection, nevertheless the structure is also such that the ejecting force, *i. e.* that part of the pressure which becomes converted into thrust on the wedge in the direction parallel to the axis of the wheel, is resisted even in case of the absence of sufficient friction and is changed in direction so that it also is ultimately borne on the felly rigidly and constantly, being supported on the angle plate so that its effect is to tighten it and the other parts rather than to loosen any of them. There is also provision for adjustment of the wedge which enables the parts always to be brought into the relation to each other in which this condition is established, by pressing the wedge farther in between the felly band and the rim until the bearing is made between the felly band and the rim as above described.

In the accompanying drawings, which illustrate an embodiment of the invention,

Figure 1 is a section through a rim and its mounting;

Fig. 2 is a side elevation of a detail, the angle plate; and

Fig. 3 is a side elevation of another detail, the lever-wedge.

Referring to the drawings, 10 represents the spoke, 11 the felly and 12 the demountable rim of a wheel, the felly being inclosed by a peripheral plate or felly band 13 which affords a bearing surface for the rim and for the removable lever-wedge that supports one edge of the rim. The rim may be of any suitable type and therefore need not be defined here in detail. When the wheel is in use the weight of the car presses the rim strongly toward the felly. This pressure is resisted by the upturned edge 13' of the band 13 on one side of the wheel, and by a succession of lever-wedges arranged at intervals around the other side of the wheel, eight being a suitable number of these for use under ordinary circumstances. The wedge portions 14 of these lever-wedges are inserted laterally, i. e., in the direction parallel to the axis of the wheel, between the rim and said band 13. The arm portion of the lever-wedge illustrated is marked 15, and the fulcrum 16, the power to operate the wedge being applied through a bolt 17, nut 18 and washer 19 located between the fulcrum and the wedge. The fulcrum consists of a pocket or recess into which projects a spur 20 arranged at the end of the lever that is remote from the wedge, the recess being in the angle plate 21 that is mounted on the side of the wheel. As represented in the drawing, this fulcrum recess 16 is located so far from the periphery of the rim as to be just beyond the inner face of the felly, toward the axis, and the plate 21 is angular, as seen in Fig. 1, having a portion formed to engage the said inner face of the felly and having also a spur 21' which projects obliquely into the felly. The other portion of the plate 21, the shape of which is seen in Fig. 2, lies on the side of the felly and extends toward the rim, near which it is fastened by two screws 22 which pass through it into the felly. Thus this plate, in addition to being held by the screws, has an angular bearing upon the felly and a spur entering the interior angularly. Pressure coming upon the plate through the fulcrum point 16 tends to turn the plate around the adjacent square corner of the felly, and thus results merely in throwing that portion of the plate 21 which is under, in the drawing, and from which the spur projects, the more solidly against the inner surface of the felly. This pressure of the part of the angle plate 21 which extends parallel to the axis of the wheel, pressing against the inner face of the felly 11, effectually prevents the whole plate from rotating, including that part which is radial and which would have a tendency to be swung outward in direction of withdrawing the screw, were it not for the part which extends parallel to the axis.

The plate 21 preferably has an open slot 23 at the top, for passage of the bolt 17 and the lever-wedge has a slot 24 for the passage of the same, surrounded by a spherical depression 25 wherein the spherical sided washer 19 may fit.

In use, the rim, carrying its tire, is installed in the position illustrated; and the other parts are then assembled in the position illustrated, the plate 21 being permanent on the felly and the lever-wedge being removable. The nut 18 is then tightened, in the course of which operation the lever swings about its fulcrum 16, and the wedge portion 14 is driven between the rim 12 and the band 13 until the desired position has been reached. The wedge portion is formed with a concave outer surface adapted to fit approximately the shape of the rim, and with a slightly convex inner surface, or at least with the point of the wedge thinned at a more acute angle than the body of the wedge, with the result that the body of the wedge, as distinguished from the point of the wedge, always finds a bearing on the band 13 whatever be the degree to which it has been tilted by swinging around the point 16 as a center while being driven inward. This bearing is definitely inside the edge of the band 13, and the pressure from the rim, when the vehicle is in use, passes through it to the band 13 and so to the felly. If the component of the rim's pressure resolved in the horizontal direction be sufficient to overcome the static friction, expulsion of the wedge will be resisted by the bolt 17, whose nut has a perfect bearing on the lever-wedge through the spherical washer 19, and by the angle plate and support 21, 21' as hereinafter described. Obviously the outer surface of the wedge, which approximately fits the shape of the rim, should have a somewhat larger radius of curvature than the rim or else the result above specified, that the bearing occurs definitely inside of the edge of the band 13, will never be attained, for the wedge will engage the outer part of the rim and the pressure from the rim would not be sustained firmly or with solidity on the felly band 13. Under the stress of use however, the extreme portions of the rim may apply pressure to the wedge in the direction of the arrow and at a point outside its bearing on the band 13. The invention, in one of its aspects, is concerned with the distribution and resistance of such a stress, abnormal in the present invention, but which, in lugs as heretofore made, has had the effect of bending the lug or its bolt, or both, outward into a shape where it does not afford a permanent support for the rim and cannot by any means be made to afford such a support. In the construction illustrated, owing to the integral character of the lever-wedge element, whatever pressure is exerted by the tire through the rim obliquely outward, as indicated by the arrow, after bending the rim far enough to engage the outer part of the wedge, tends to turn the wedge and lever about the bearing of the wedge on the band 13. This incidentally presses the previously mentioned fulcrum 16 inward to the right, as represented in the drawings, and this in turn serves merely to seat the plate 21 more firmly against the felly instead of tending to pull it out of position. Whatever tendency this pressure at 16 might have to pull the screws 22 out of their holes by reason of the plate 21 turning about the corner of the felly, is resisted by the portion of the plate which is turned at a right angle and bears against the inner face of the felly. Where this plate does not happen to come opposite a spoke, it may be extended for a long distance inward as indicated by the drawing Fig. 1. The spur 21' also helps maintain this plate in position. This spur may easily be formed by drilling a hole in the plate 21 at the proper angle, with the aid of a jig, to receive this pin. When the plate has been put into position, and has been fastened by the screws 22, it is secure and affords a support such that no stress applied through the tire and rim can bend the lever-wedge outward from its adjusted position in which it firmly supports the rim. The wedge is at the same time adjustable inward to any desired further degree, because of the space existing between the plate 21 and the lever arm 15, to accommodate rims which may vary slightly in dimension or form.

If the pressure of the rim upon the wedge portion chances to fall outside of the line of contact between the latter and the band 13, to the left thereof in Fig. 1, as in the above described abnormal case, the result is a turning moment about said line of contact; and the spur 20 tends to turn about said line and so is pressed to the right, instead of radially toward the axis, and has merely the effect of seating the angular plate 21 yet more firmly upon the felly. Thus tendency to displace that plate toward the axis is avoided. It is obvious that the surface of the wedge next to the felly is not necessarily a curve, but might be a convex angular surface with the same effect. The location of the fulcrum 16 beyond or on the inner side of the inside of the felly, thus obtaining a relatively long leverage for holding the wedge in place, might result in a tendency to pull the screws 22 out, but the bearing of the plate 21 on the inside of the felly protects those screws. The spur 21' also aids in this, and in holding the plate in position against any other stresses that may occur in use.

I claim as my invention:—

1. A mount for demountable rims, comprising a plate fixed on the felly of the wheel and bearing on the side and inside thereof; a lever fulcrumed thereon at a point inside of the inmost extent of the side of the felly; means drawing said lever toward the felly; and a wedge adapted to be drawn by the lever between the felly and the rim.

2. A mount for demountable rims, comprising a plate fixed on the side of the felly, and having a spur integral therewith and projecting obliquely into the felly in a direction from the inner toward the outer sides thereof; a lever fulcrumed on said plate; means drawing the lever toward the side of the felly, and a wedge pressed thereby between the felly and rim.

3. A mount for demountable rims, comprising a plate fixed on the felly of a wheel, and bearing on the side and inside thereof, and having a spur projecting obliquely into the felly; a lever fulcrumed on the plate at a point inside of the inmost extent of the side of the felly; means drawing said lever toward the felly; and a wedge pressed between the felly and rim by the lever.

4. A mount for demountable rims, comprising a lever fulcrumed beside the felly, a wedge held by the lever at its outermost end, and means acting on the lever between said fulcrum and wedge to draw it toward the felly, and thus draw the wedge in between the felly and rim; the wedge being so acute that it normally finds bearing on one side against the rim and on the other side against the wheel over the cylindrical face of the felly, and so that the static friction approximately balances the ejecting component of pressure between rim and felly.

5. A mount for demountable rims, comprising a lever fulcrumed at one of its ends near the inner edge of the felly; said lever being at its other end formed integrally into a concavo-convex wedge having its concave side of flatter curvature than the adjacent side of the rim and adapted to be inserted between the felly and the rim; combined with a bolt piercing the felly and engaging the middle part of the lever.

6. A mount for demountable rims, comprising a lever fulcrumed at one of its ends near the inner edge of the felly; said lever being at its other end formed integrally into a wedge adapted to be inserted between the felly and the rim; combined with a bolt piercing the felly and engaging the middle part of the lever; said wedge being convex toward the felly and concave toward the rim, whereby a line contact is obtained between the wedge and wheel about which a turning moment in the wedge and lever arm results from radial pressure of the rim.

7. A mount for demountable rims comprising a lever fulcrumed at one end against an abutment on a side of a felly and extending thence outward, with a space between it and the side of the felly; said lever being formed at its other end into a wedge adapted to be inserted between the felly and the rim; and means holding said lever toward the felly; said wedge being formed convex toward the felly, whereby a line contact of the wedge with the wheel is made, and pressure of the rim outside of said line is resolved, at said fulcrum, into a pressure approximately normal to the side of the felly.

Signed by me at Boston, Mass., this twenty-fourth day of May, 1915.

FREDERICK LOWE.

Witnesses:
EVERETT E. KENT,
ANNA B. LINDSAY.